March 20, 1973
C. C. CHAPMAN ET AL
3,721,720
PURIFICATION OF HF CATALYST IN ALKYLATION PROCESS
Filed Jan. 25, 1971
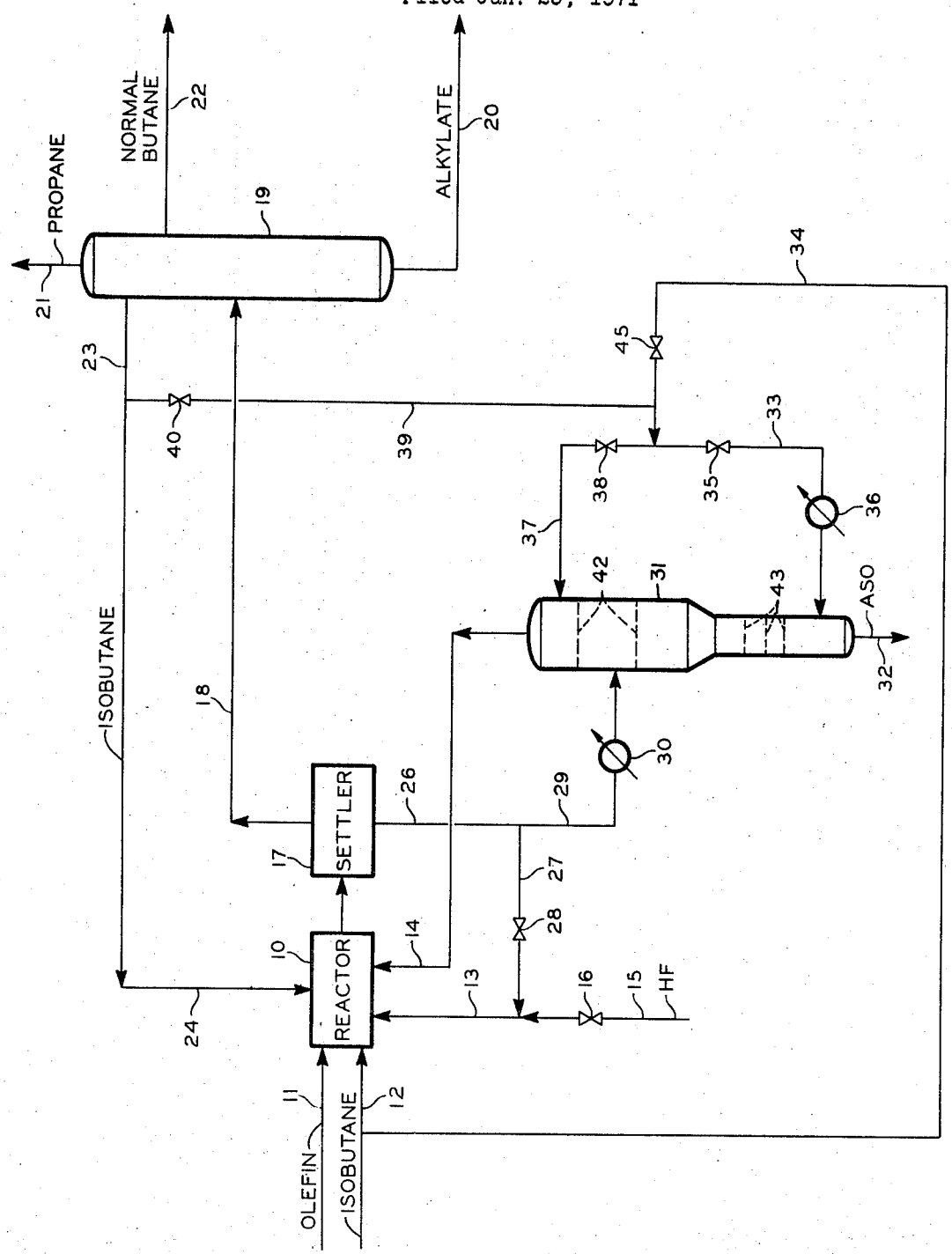
INVENTOR.
W. P. CANNADY
C. C. CHAPMAN
J. VAN POOL
BY Young & Quigg
ATTORNEYS United States Patent Office 3,721,720
Patented Mar. 20, 1973

3,721,720
PURIFICATION OF HF CATALYST IN
ALKYLATION PROCESS
Charles C. Chapman, William P. Cannady, and Joe Van
Pool, Bartlesville, Okla., assignors to Phillips Petroleum
Company
Filed Jan. 25, 1971, Ser. No. 109,165
Int. Cl. C07c 3/54
U.S. Cl. 260—683.48                              5 Claims

ABSTRACT OF THE DISCLOSURE

Olefins and isoparaffins are alkylated in the presence of an HF catalyst. The reactor effluent is passed to a settling zone. The hydrocarbon phase is fractionated to recover an alkylate product. The acid phase is recycled to the reactor. A portion of the recycled acid is passed to a purification column for removal of acid soluble oil. Stripping vapor and reflux liquid are passed to the purification column in specific ratios to remove a substantial amount of the HF from the acid soluble oil.

It is common practice in the petroleum industry to produce high octane motor fuel by alkylating olefins with isoparaffins in the presence of a hydrogen fluoride (HF) catalyst. The effluent from the alkylation reactor is usually passed to a settling vessel wherein a hydrocarbon phase is separated from an acid phase. The hydrocarbon phase is fractionated to separate low boiling hydrocarbons from the alkylate product. The acid phase is recycled to the reactor. However, it is necessary to purify a portion of the recycled acid in order to prevent a buildup of acid soluble oil (ASO) in the system. This purification is usually accomplished by passing an HF-containing stream from the settler to a purification column wherein HF is stripped from the ASO by means of a vaporous hydrocarbon such as isobutane. While the HF purification systems employed heretofore have generally been effective to produce an acid stream having the required purity, the ASO stream from the purification unit usually has contained undesirable amounts of HF. This has required subsequent purification steps to remove the HF before the ASO is recycled to the refinery or passed to a disposal unit.

In accordance with this invention, a method is provided for operating an HF purification unit so as to produce an HF stream of high purity and to produce an ASO stream of low HF content. This is accomplished by maintaining the ratio of the total reflux and stripping hydrocarbon to the HF feed within preselected limits and by maintaining the ratio of reflux to stripping hydrocarbon within preselected limits. The HF feed is introduced into the purification column at a temperature sufficiently high to maintain the HF in the vapor phase.

The accompanying drawing is a schematic representation of an HF alkylation process employing an HF purification unit operated in accordance with the method of this invention.

Referring now to the drawing in detail, there is shown an alkylation reactor 10. An olefin feed stream is introduced through a conduit 11 and an isoparaffin feed stream is introduced through a conduit 12. The olefin feed generally comprises one or more olefins having from 2 to 5 carbon atoms, while the isoparaffin stream generally comprises isobutane and/or isopentane. In a typical operation, the olefin feed comprises a mixture of propylene and butylenes, while the isoparaffin feed comprises primarily isobutane. A catalyst comprising hydrogen fluoride is introduced into reactor 10 through a conduit 13 and through a recycle conduit 14. In a typical operation, the HF is in the liquid phase and has a purity of about 90%. Fresh makeup catalyst can be introduced as required through a conduit 15 which has a valve 16 therein. The effluent from reactor 10 is passed to a settler 17 in which a phase separation is made between the acid and hydrocarbons. The hydrocarbon phase is removed through a conduit 18 and passed to a fractionator 19. The fractionator is operated to produce a bottoms alkylate product stream which is removed through a conduit 20, an overhead propane stream which is removed through a conduit 21, a normal butane stream which is removed through a side conduit 22, and an isobutane stream which is removed through a side conduit 23. The isobutane is recycled to reactor 10 through a conduit 24.

The acid phase is removed from settler 17 through a conduit 26. A portion of this stream is recycled directly to reactor 10 through a conduit 27 which has a valve 28 therein. The remainder of the HF is passed through a conduit 29, which has a heater 30 therein, to an acid purification column 31. A purified HF stream is removed from the top of column 31 through conduit 14 and recycled to reactor 10. An ASO stream is removed from the bottom of column 31 through a conduit 32. HF is stripped from the ASO in column 31 by means of a vaporous hydrocarbon stream which is introduced into the lower region of column 31 through a conduit 33. This stripping hydrocarbon can be isobutane which is directed to conduit 33 through a conduit 34 which communicates with inlet conduit 12. A valve 45 is disposed in conduit 34. A valve 35 and a heater 36 are disposed in conduit 33. A hydrocarbon reflux liquid is introduced into the upper region of column 31 through a conduit 37 which has a valve 38 therein. The stripping and reflux hydrocarbon can be supplied from conduit 34 or from a conduit 39 which communicates with conduit 23. A valve 40 is positioned in conduit 39 to control the flow of recycle isobutane.

In accordance with this invention, the flows through conduits 29, 33 and 37 are maintained in a predetermined relationship and the temperature and pressures of the materials introduced into column 31 are controlled so that there is a minimum quantity of HF present in the ASO stream removed through conduit 32. The volume ratio of reflux liquid supplied through conduit 37 to the stripping vapor (expressed as a liquid) supplied through conduit 33 is maintained in the range of 0.1:1 to 0.35:1. The volume ratio of total hydrocarbon introduction, reflux liquid through conduit 37 and stripping vapor (expressed as a liquid) through conduit 33, to feed through conduit 29 is maintained in the range of 1:1 to 3:1. The relationship between the foregoing ratios is such that the ratio of reflux to stripping vapor is approximately the maximum 0.35:1 when the ratio of total hydrocarbon to feed is the maximum 3:1 and is approximately the minimum 0.1:1 when the ratio of total hydrocarbon to feed is the minimum 1:1. The temperature of the feed introduced into column 31 through conduit 39 should be sufficiently high to maintain all of the HF in the vapor state. The temperature of the feed should be in the range of 275 to 310° F. The bottom of column 31 is maintained at a temperature of about 275 to 375° F. and the top of the column is maintained at a temperature of about 220 to 240° F. The reflux is introduced at a temperature of about 40 to 120° F., and the stripping vapor is introduced at a temperature of about 325 to 425° F. A typical operating pressure for column 31 is 100 p.s.i.g.

In a specific example of the operation of this invention, column 31 was employed to purify an acid stream obtained from the settler of an HF alkylation reaction in which a mixture of propylene and butylenes was alkylated with isobutane. The upper section of column 31 was approximately eight feet high and had a diameter of five feet. Two trays 42 separated by a height of four feet were disposed in this section. The lower section of column 31 was approximately twelve feet high and had a diameter of two feet. Three trays 43 about eighteen inches apart were disposed in this section. Acid from settler 17 was introduced between trays 42 at a rate of about 240 barrels per day and at a temperature of about 285° F. Vaporous isobutane at a temperature of about 329° F. was introduced through conduit 33 at a rate of about 408 barrels per day (based on liquid volume). Liquid isobutane at a temperature of about 70° F. was introduced through conduit 37 at a rate of about 72 barrels per day. This provided a volume ratio of reflux to stripping isobutane of about 0.18:1 and a volume ratio of total isobutane to feed of about 2:1. ASO at a temperature of about 318° F. was removed through conduit 32 at a rate of about 13.6 barrels per day. This ASO contained about 11 pounds HF and had a water content of about 0.4 weight percent. A stream of regenerated HF and isobutane was removed through conduit 14 at a temperature of about 233° F. Column 31 was maintained at a pressure of about 100 p.s.i.g.

In a typical commercial operation conducted prior to this invention, the same quantity of used acid was treated in column 31. However, the feed, overhead and bottom temperatures were 265° F., 215° F. and 260° F., respectively. The flows of stripping and reflux isobutane were each 96 barrels per day. Other conditions were the same as described above. In this operation, ASO was removed through conduit 32 at a rate of about 29 barrels per day. This ASO contained about 1910 pounds of HF and contained about 5 weight percent water. Thus, operating in accordance with this invention reduced the HF present in the ASO stream from 1910 pounds per day to 11 pounds per day. This greatly simplifies the disposal problem of the ASO, and allows recovery of about 1900 pounds per day of HF catalyst.

While this invention has been described in conjunction with a presently preferred embodiment, it obviously is not limited thereto.

What is claimed is:

1. In an alkylation process employing an HF catalyst, in which the effluent from the reaction zone is passed to a settling zone to remove a stream containing HF and acid soluble oil; the method of purifying said stream which comprises introducing said stream into an intermediate region of a vertically extending separation zone at a temperature sufficiently high to vaporize HF in said stream; introducing vaporous hydrocarbon into the lower region of said separation zone to strip HF from acid soluble oil; introducing liquid hydrocarbon into an upper region of said separation zone as reflux, maintaining the volume ratio of reflux hydrocarbon to stripping hydrocarbon (expressed in terms of liquid) in the range of 0.1:1 to 0.35:1, maintaining the volume ratio of total reflux and stripping hydrocarbon (expressed in terms of liquid) to said stream introduced into said separation zone in the range of 1:1 to 3:1; removing an acid soluble oil stream from the bottom of said separation zone; and removing a stream containing purified HF from the top of said separation zone.

2. The method of claim 1 in which isobutane is alkylated with olefins and said stripping and reflux hydrocarbon comprises isobutane.

3. The method of claim 2 wherein the ratio of reflux to stripping isobutane is about 0.18:1 and the ratio of total reflux and stripping isobutane to said stream is about 2:1.

4. The method of claim 2 wherein said stream is introduced into said separation zone at a temperature in the range of about 275 to 310° F., the bottom of said separation zone is maintained at a temperature in the range of about 275 to 375° F., the top of said separation zone is maintained at a temperature in the range of about 220 to 240° F., the liquid isobutane is introduced into the separation zone at a temperature in the range of about 40 to 120° F., and the vaporous isobutane is introduced into the seperation zone at a temperature in the range of about 325 to 425° F.

5. The method of claim 4 wherein said stream is introduced into said separation zone at a temperature of about 285° F., the bottom of said separation zone is maintained at a temperature of about 318° F., the top of said separation zone is maintained at a temperature of bout 233° F., the vaporous isobutane is introduced into the separation zone at a temperature of about 329° F., and the pressure within the separation zone is maintained about 100 p.s.i.g.

References Cited
UNITED STATES PATENTS

| | | | |
|---|---|---|---|
| 3,478,125 | 11/1969 | Chapman | 260—683.48 |
| 3,551,515 | 12/1970 | Gentry | 260—683.48 |
| 3,206,524 | 9/1965 | Plaster | 260—683.48 |

CURTIS R. DAVIS, Primary Examiner

G. J. CRASANAKIS, Assistant Examiner